Sept. 30, 1930.  W. F. BULL  1,777,032
SHEARING DEVICE
Filed July 5, 1928    2 Sheets-Sheet 1

INVENTOR
William Francis Bull
BY
ATTORNEY

Sept. 30, 1930.                 W. F. BULL                    1,777,032
                              SHEARING DEVICE
                           Filed July 5, 1928              2 Sheets-Sheet 2
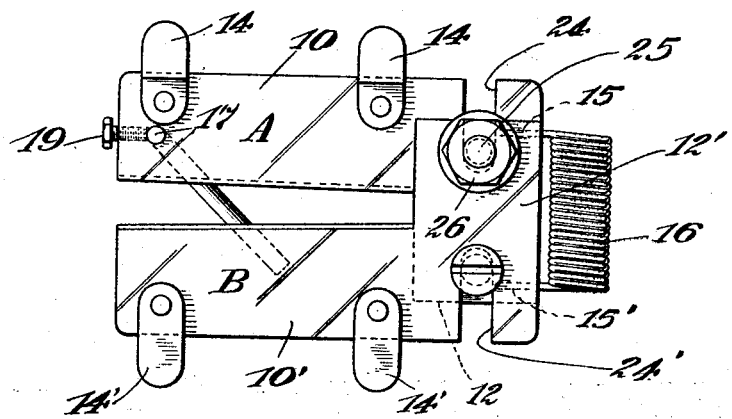
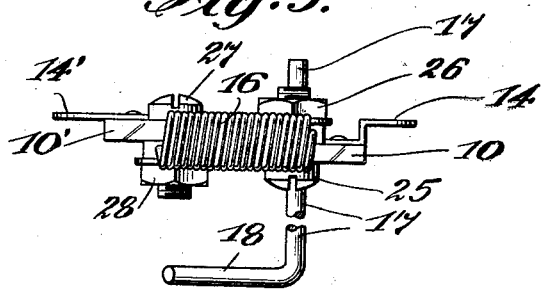
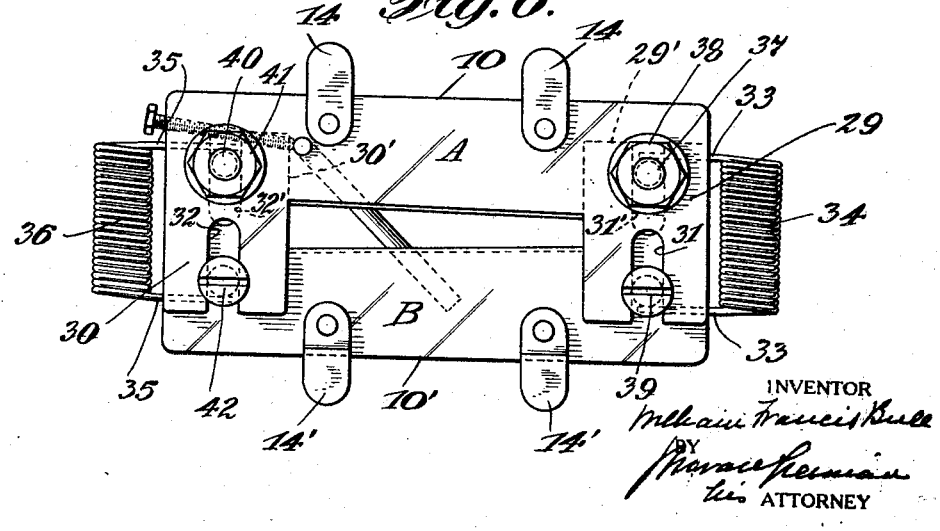

Patented Sept. 30, 1930

1,777,032

UNITED STATES PATENT OFFICE

WILLIAM FRANCIS BULL, OF BROOKLYN, NEW YORK

SHEARING DEVICE

Application filed July 5, 1928. Serial No. 290,553.

My invention relates to shearing devices and refers particularly to portable shearing devices adapted for use with vises or similar mechanisms.

It is frequently desirable to cut metal bars, or strips, at the place of their application and as the usually employed shearing devices are large and heavy considerable inconvenience and difficulty are occasioned in their transportation and use.

The device of my invention overcomes these objectionable features incident to the usually employed devices and presents a shearing device which is light, compact, strong and highly efficient, the novelty of its employment being that it is adapted to be used with any form of a vise or similar contractable jaw mechanism.

As small vises are usually included in a tool kit, my device presents a simple and effective means of accomplishing a shearing effect.

It is evident that my device also presents valuable attributes in the machine shop where vises of a larger size are employed, as it eliminates the necessity of large, heavy and expensive shearing machines.

My invention comprises connected shearing knives capable of being suspended between the jaws of a vise in such a manner that the ordinary operation of the vise will operate my device in a most efficient manner.

The novelty and usefulness of my device will be evident upon a consideration of my specification and with its accompanying drawings.

In the accompanying drawings illustrating modified forms of my device, similar parts are designated by similar numerals.

Figure 4 is a top view of a modified form of my device.

Figure 5 is an end view of Figure 4.

Figure 6 is a top view of the modified form of my device.

Figure 1:
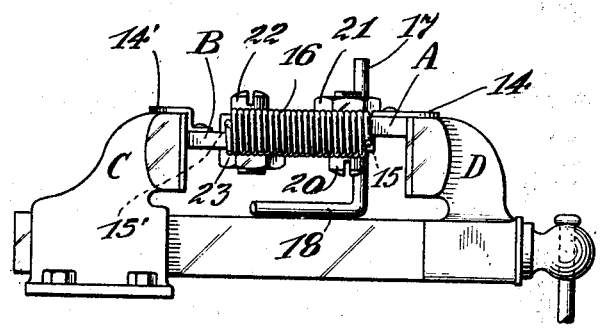
Figure 1 is a side view of one form of my device incorporated between the jaws of a screw vise.
Figure 2:
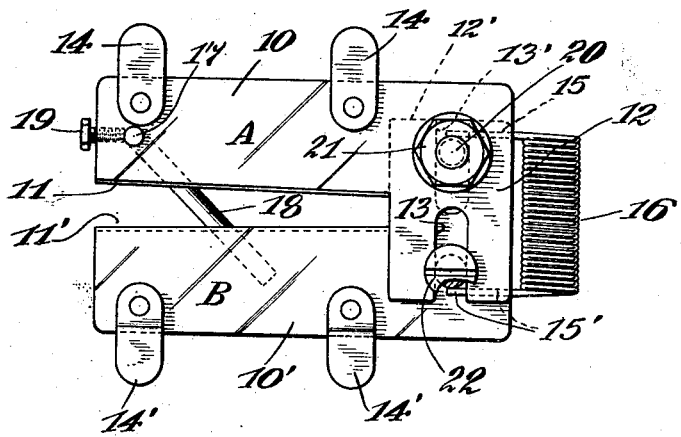
Figure 2 is an enlarged top view of my device shown in Figure 1.
Figure 3:
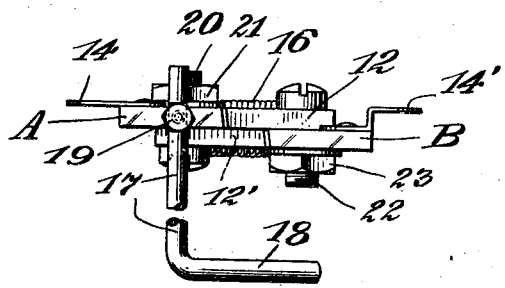
Figure 3 is an end view of Figure 2.

The particular form of the device of my invention shown in Figures 1, 2 and 3 comprises two shearing members A and B of the same form and size.

The shearing member A consists of the base member 10, having its edge 11 sharpened for shearing, or cutting effect, and the guide arm 12 extended at right angles to the base member 10. The guide arm 12 has a slot recess 13 and the base 10 carries the supporting fingers 14, 14.

As the shearing member B corresponds to the shearing member A its several elements are referred to by prime numerals.

The two ends 15 and 15' of the cylindrical coil spring 16 pass through openings in the ends of the shearing members A and B, respectively, and extend across the respective slot recesses 13 and 13'.

An adjustable stop comprises the right angled arms 17 and 18, the arm 17 passing through an opening in the shearing member A and being maintained in any desired position by means of the set screw 19 threaded through an opening in the end of the shearing member A.

A threaded screw bolt 20 is passed through the slot 13' of the shearing member B and through a tapped hole in the shearing member A, and has a lock nut 21 threaded thereon A threaded screw bolt 22 is passed through the slot 13 of the shearing member A and through a tapped hole in the shearing member B and has a lock-nut 23 threaded thereon.

The screws 20 and 22 are screwed inwardly until the heads just abut upon the guide arms 12' and 12 and the lock nut set, thus holding the members A and B closely together so that their edges will shear properly but not tight enough to prevent the shearing operation.

It will be noted that the two ends 15 and 15' of the spring 16 act as stops, preventing the screws 20 and 22 from moving out of the recesses 13 and 13' and that the removal of the spring will allow the separation of the two shearing members A and B.

The operation of the device is as follows:—

The device is placed between the jaws C and D of a vise (Figure 1) and is supported by the support fingers 14, 14, 14', 14', the jaws of the vise abutting upon the outside edges of the shearing members A and B. The material to be cut is placed between the two cutting edges 11 and 11', the position of the material within the device being fixed by the adjustable stop arm 18. The jaws of the vise are then brought together in the usual manner thus causing the device to shear the material.

The modification of my device shown in Figures 4 and 5 is similar to the form of my device previously described except that the base members A and B have the slot recesses 24 and 24' respectively instead of the guide arm slot recesses 13 and 13' of the device shown in Figures 1, 2 and 3, and the ends 15, 15' of the spring 16 enter the guide arms 12 and 12' but do not pass across the slot recesses 24 and 24'.

A threaded screw bolt 25 passes through the slot 24 of the base 10 and through the tapped hole in the guide arm 12' and has a lock nut 26 threaded thereon.

A threaded screw bolt 27 passes through the slot 24' of the base 10' and through a tapped hole in the guide arm 12 and has a lock nut 28 threaded thereon.

The operation of this device is as explained for the device of Figures 1, 2 and 3 with the exception that the outward movement of the two shearing members A and B is limited by the abutment of the two bolts 25 and 27 against the inner walls of the slot recesses 24 and 24'.

The modification of my device shown in Figure 6 is similar to that of Figures 1, 2 and 3 with the exception that it has a spring connecting means, guide arms, slot recess and bolt and lock nut at each end of the shearing member in order to maintain them in increased coordinated positions with respect to each other.

In this form of my device, the base 10 has the two guide arms 29 and 30, having the slot recesses 31 and 32 respectively.

The base 10' is similarly constructed and the corresponding parts are designated by similar prime numerals.

The two ends 33, 33, of the coil spring 34 pass through the openings in the ends of the shearing members A and B and extend across the respective slot recesses 31 and 31'.

The two ends 35, 35, of the coil spring 36 pass through the openings in the ends of the shearing members A and B and extend across the respective slot recesses 32 and 32'.

A threaded screw bolt 37 is passed through the slot 31' of the shearing member B and through a tapped hole in shearing member A and has a lock nut 38 threaded thereon.

A threaded screw bolt 39 is passed through the slot 31 of the shearing member A and through a tapped hole in shearing member B and has a lock nut (not shown) threaded upon the other end thereof.

A threaded screw bolt 40 is passed through the slot 32' of the shearing member B and through a tapped hole in shearing member A and has a lock nut 41 threaded thereon.

A threaded screw bolt 42 is passed through the slot 32 of shearing member A and through a tapped hole in shearing member B and has a lock nut (not shown) threaded on the other end thereof.

It will thus be seen that the device of my invention presents a small, portable shearing device of strong and desirable construction, capable of easy dismemberment for purpses of sharpening and capable of adaptation to a vise, the operation of the shearing elements being accomplished by the operating mechanism of the vise.

I do not limit myself to the particular size, shape, number or arrangement of parts as shown and described as these are given simply as a means for clearly describing my invention.

What I claim is :—

1. In a shearing device, in combination, two shearing members, spring means the tension of which tends to separate the cutting edges of the two shearing members, a bolt carried by each shearing member slidable within a slot in the other shearing member and suspending means carried by the device capable of suspending the device between the jaws of a vise.

2. In a shearing device, in combination, two shearing members, a spring connecting the two shearing members, the tension of the spring normally tending to separate the cutting edges of the two shearing members, the ends of the springs preventing the separation of the two shearing members; means maintaining the shearing members in parallel planes and allowing of their movement toward each other, and suspending means carried by the device capable of suspending the device between the jaws of a vise.

3. In a shearing device, in combination, two shearing members, means connecting the two shearing members and normally tending to bring the shearing means into non-shearing position, means allowing the two shearing members to be disengaged from each other, means maintaining the shearing members in parallel planes and allowing their shearing edges to be moved toward each other and suspending means carried by the device capable of suspending the device between the jaws of a vise.

4. In a shearing device, in combination, two shearing members, a coiled spring connecting the two shearing members; means allowing the disengagement of the two shearing members from each other; a bolt carried by each shearing member and passing through a slot in the other shearing member maintaining the two shearing members in parallel planes while allowing their movement toward each other and suspending means carried by each member capable of suspending the device between the jaws of a vise.

5. In a shearing device, in combination, two shearing members, a coiled spring connecting the two shearing members and preventing their disengagement from each other, a bolt carried by each shearing member and passing through a slot in the other shearing member maintaining the two shearing members in parallel planes while allowing their movement toward each other, suspending means carried by each shearing member capable of suspending the device between the jaws of a vise and an adjustable stop carried by the device.

6. In a shearing device, in combination, two shearing members, each having a guide arm with a recess therein, a bolt passing through each shearing member and the other shearing member guide arm recess allowing a movement of the shearing members with respect to each other and spring means the tension of which normally tends to separate the cutting edges of the two shearing members.

Signed at Brooklyn in the county of Kings and State of New York this 28th day of June, 1928.

WILLIAM FRANCIS BULL.